(12) United States Patent
Heise et al.

(10) Patent No.: US 9,157,820 B2
(45) Date of Patent: Oct. 13, 2015

(54) BRAKE MOUNTING, APPARATUS AND METHOD FOR DETERMINING A MEASUREMENT VARIABLE FOR A BRAKE FORCE OR FRICTIONAL FORCE ACTING ON A DISK BRAKE

(75) Inventors: Andreas Heise, Erzhausen (DE); Peter Lohberg, Friedrichsdorf (DE); Wolfgang Erler, Taunusstein (DE); Michael Zydek, Frankfurt/Main (DE)

(73) Assignee: CONTINENTAL TEVES AG & CO. OHG, Frankfurt (DE)

( * ) Notice: Subject to any disclaimer, the term of this patent is extended or adjusted under 35 U.S.C. 154(b) by 134 days.

(21) Appl. No.: 13/881,640

(22) PCT Filed: Oct. 17, 2011

(86) PCT No.: PCT/EP2011/068091
§ 371 (c)(1),
(2), (4) Date: Apr. 25, 2013

(87) PCT Pub. No.: WO2012/059313
PCT Pub. Date: May 10, 2012

(65) Prior Publication Data
US 2013/0233065 A1 Sep. 12, 2013

(30) Foreign Application Priority Data
Nov. 3, 2010 (DE) .......................... 10 2010 043 320

(51) Int. Cl.
*G01M 17/007* (2006.01)
*G01L 5/28* (2006.01)
(Continued)

(52) U.S. Cl.
CPC ................ *G01L 5/28* (2013.01); *F16D 55/226* (2013.01); *F16D 66/00* (2013.01); *F16D 2055/0008* (2013.01); *F16D 2066/005* (2013.01)

(58) Field of Classification Search
CPC ............................... G01L 5/28; G01M 17/007
USPC ..................................... 73/121, 128, 129, 130
See application file for complete search history.

(56) References Cited

U.S. PATENT DOCUMENTS 5,372,221 A * 12/1994 Jalbert ..................... 188/1.11 L
7,032,721 B2 * 4/2006 Baumgartner ............... 188/71.9
(Continued)

FOREIGN PATENT DOCUMENTS

DE 35 02 049 A1 7/1986
DE 35 02 050 A1 7/1986
(Continued)

OTHER PUBLICATIONS

PCT International Search Report—Jan. 30, 2012.
(Continued)

*Primary Examiner* — Eric S McCall
(74) *Attorney, Agent, or Firm* — Brinks Gilson & Lione

(57) ABSTRACT

A location-determining device in a motor vehicle having at least one receiver device for receiving position signals and time signals for a multiplicity of satellites assigned to a global navigation system and a location-calculating module for calculating location information based on received position data and time data. The location-determining device has at least one receiver device structurally integrated into the housing of an optical sensor unit, wherein the housing is arranged in a passenger compartment in a region of an upper edge of a windscreen, and wherein the housing does not have more than a single connection to a vehicle data bus and not more than a single connection to a vehicle power supply.

16 Claims, 11 Drawing Sheets

(51) Int. Cl.
*F16D 55/226* (2006.01)
*F16D 66/00* (2006.01)
*F16D 55/00* (2006.01)

(56) References Cited

U.S. PATENT DOCUMENTS

| | | | |
|---|---|---|---|
| 2003/0084714 A1* | 5/2003 | Chang et al. | 73/121 |
| 2004/0026188 A1* | 2/2004 | Emmett et al. | 188/73.1 |
| 2004/0159512 A1 | 8/2004 | Mohr | |
| 2005/0126864 A1* | 6/2005 | Boisseau | 188/72.2 |
| 2005/0161290 A1* | 7/2005 | Donadoni et al. | 188/1.11 L |
| 2006/0021832 A1* | 2/2006 | Usui et al. | 188/73.1 |
| 2009/0320579 A1* | 12/2009 | Ante et al. | 73/121 |
| 2011/0005872 A1* | 1/2011 | Baumgartner et al. | 188/73.31 |
| 2011/0174581 A1* | 7/2011 | Vollert et al. | 188/72.1 |
| 2012/0198926 A1* | 8/2012 | Baumgartner et al. | 73/132 |
| 2012/0292141 A1* | 11/2012 | Takahashi | 188/72.3 |
| 2013/0008749 A1* | 1/2013 | Sandberg et al. | 188/71.8 |

FOREIGN PATENT DOCUMENTS

| | | |
|---|---|---|
| DE | 103 28 242 A1 | 1/2005 |
| DE | 10 2005 013 142 A1 | 9/2006 |
| DE | 10 2006 029 978 B3 | 11/2007 |
| DE | 20 2008 011 818 U1 | 2/2010 |
| DE | 10 2008 042 298 A1 | 3/2010 |
| EP | 0 388 040 A2 | 2/1990 |
| EP | 1 124 073 A2 | 1/2001 |
| WO | WO 92/00464 | 1/1992 |

OTHER PUBLICATIONS

German Examination Report—Apr. 8, 2011.

* cited by examiner

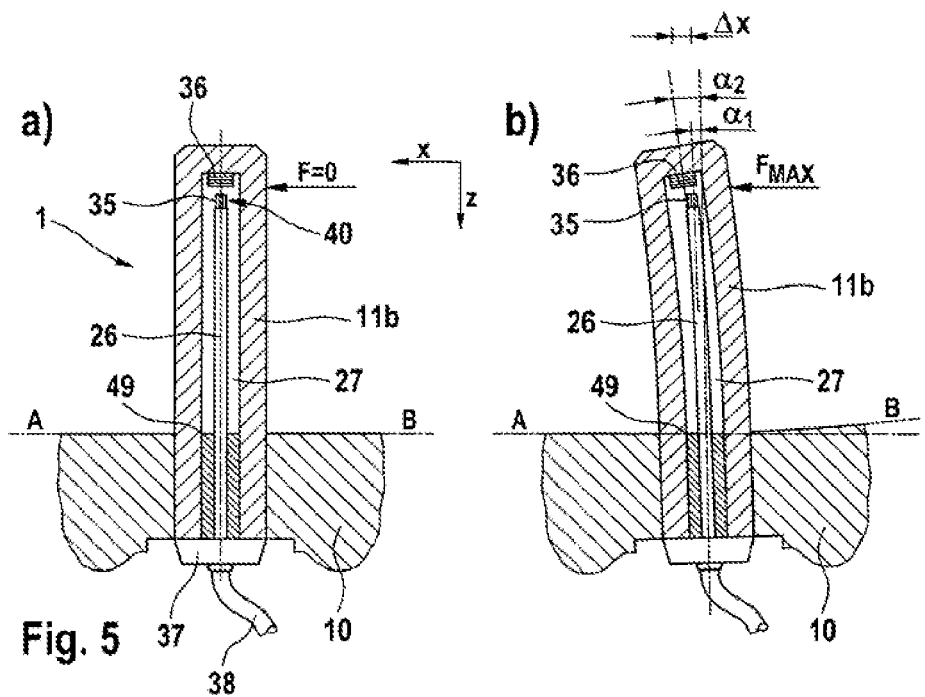
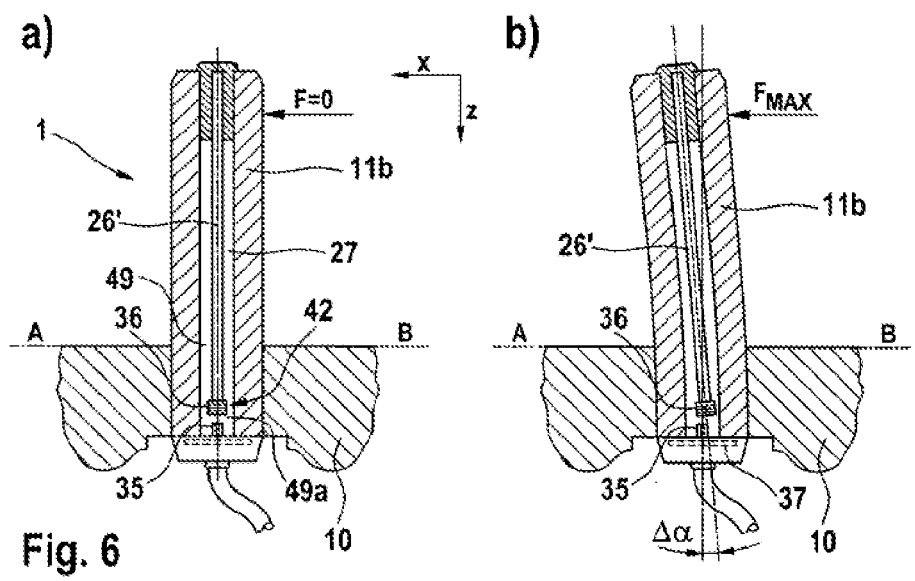
Fig. 5
Fig. 6

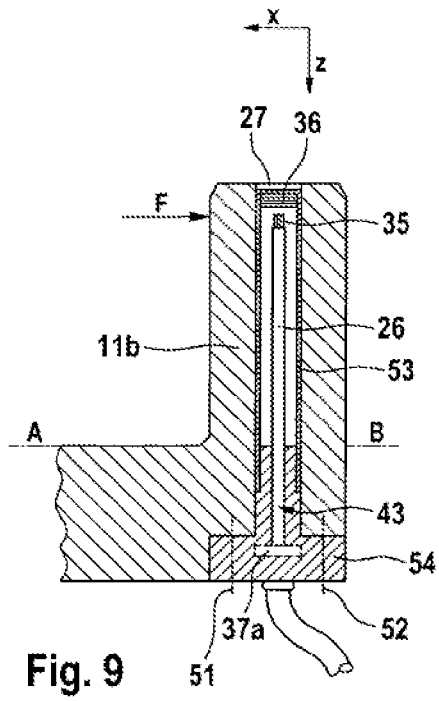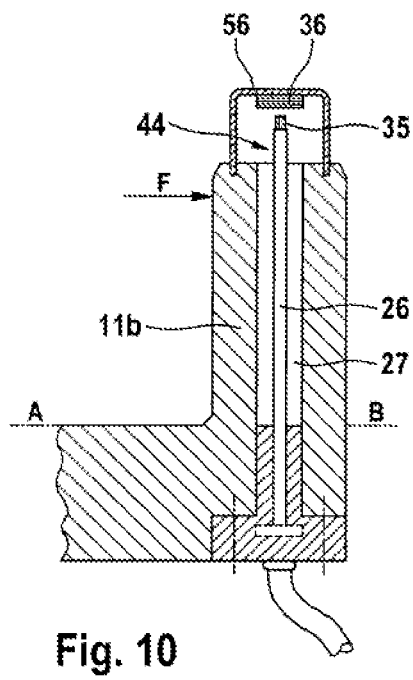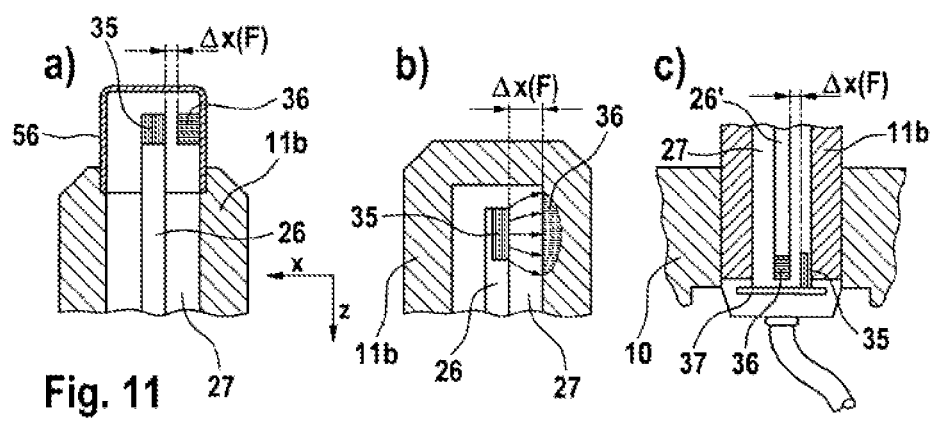

BRAKE MOUNTING, APPARATUS AND METHOD FOR DETERMINING A MEASUREMENT VARIABLE FOR A BRAKE FORCE OR FRICTIONAL FORCE ACTING ON A DISK BRAKE

CROSS-REFERENCE TO RELATED APPLICATION

This application claims priority to German Patent Application No. 10 2010 043 320.9, filed Nov. 3, 2010 and PCT/EP2011/068091, filed Oct. 17, 2011.

FIELD OF THE INVENTION

The invention relates to a brake mounting for determining a measurement variable for a brake force or a frictional force acting on a disk brake of a motor vehicle, and to an apparatus for determining a measurement variable for a brake force or a frictional force acting on a disk brake of a motor vehicle and a related method.

BACKGROUND OF THE INVENTION

In a known design a disk brake comprises a brake disk rotating on and along with a hub of a wheel to be braked, onto which friction linings in the form of brake pads or friction linings are pressed from both sides. Said friction linings are mounted in a so-called brake caliper. The brake caliper is also referred to as a caliper and spans the brake disk. Activation of the brake takes place in general hydraulically using at least one brake piston as an actuator. In motor vehicles, as a rule partial disk brakes are used, i.e. disk brakes which only use part of surface of the disk as a frictional surface.

Furthermore, with automobiles so-called floating caliper brakes are preferably used. Floating caliper brakes have actuators on only one side of the disk in contrast to fixed caliper brakes. The design of the floating caliper brake enables the brake force on both sides of the brake caliper to be built up basically by only one actuator. The longitudinally displaceably mounted or floatingly suspended brake caliper mechanically transfers the pressure applied by only one actuator to the other side of the brake disk. Floating caliper brakes only need relatively little installation space as a result of this design, so that a floating caliper brake with lower structure height in comparison to fixed caliper brakes can be positioned better. Furthermore, floating caliper brakes have high efficiency and are relatively simple in design and in maintenance. Thus friction- or friction linings can especially be changed in a short time.

In known disk brakes, hydraulically operated pistons are used as actuators, which can be displaced in suitable operating devices using hydraulic pressure. In the case of an electromechanically operated disk brake, an electromechanical actuator is used instead of a hydraulic cylinder.

In principle, with a disk brake having an electromechanical actuator there is no feedback regarding a brake force acting on a brake pedal, as is provided via the hydraulic circuit with conventional hydraulic brakes. Therefore it is particularly desirable with a disk brake having an electromechanical actuator—but also with hydraulically operated disk brakes-independently of their exact structural embodiment, to continuously and very accurately detect a brake force actually acting in operation.

Only on this basis can the disk brake be regulated reliably and with the necessary accuracy, in order to satisfy a braking demand specified by a user and also to be able to respond thereto as well as to be able to carry out slip-controlled braking (antilock braking control).

Various approaches are known from the prior art for determining the clamping force (normal force) of a disk brake, i.e. the force with which the friction linings in are forced against the brake in a direction normal to the surface of the disk brake. However, the clamping force is not proportional to the brake force (peripheral force) or the brake torque. Thus the coefficient of friction ($\mu_B$) between the friction lining and the brake disk, which is dependent on conditions such as temperature, wetness, and dirt, and fluctuates during operation, is to be taken into account as a factor. The brake torque is proportional to the brake force with a so-called effective friction radius, which is likewise variable and cannot be accurately determined. Accordingly, for a hydraulically operated disk brake according to today's state of knowledge, because of the high degree of complexity of the processes, the variation of the brake torque cannot be reliably determined from the variation of the brake pressure.

Approaches for determining the clamping force of a disk brake usually build on an elastic expansion of the brake caliper (in a direction perpendicular to the surface of the disk brake (axial direction)). It is thus known that the expansion of the brake caliper is measured with a strip strain gauge, which is glued in a yoke area of the brake caliper, with which the brake caliper fits over the brake disk. Also in DE 10 2006 029 978 B3 a method and an apparatus for measurement of a normal force acting on a disk brake are disclosed. For this purpose a device is provided on the brake caliper of the disk brake, which measures the normal force using an elastic expansion of the brake caliper during clamping of the brake by measuring a shearing movement of part of the disk brake during expansion of the brake caliper.

A brake force measurement device for a friction brake with a frame caliper is known from DE 10 2005 013 142 AI, which measures a movement of the brake caliper during braking by means of a travel measurement device having two parts moving with respect to each other. Here one of the parts of the travel measurement device is always disposed on the movable brake caliper.

The object of the invention is to provide a brake mounting, an apparatus and a method by means of which during a braking process a measure of the brake force (peripheral force) acting on a disk brake or the brake torque acting on a disk brake can be continuously detected with an inexpensive means and with adequate accuracy.

The object is achieved according to the invention by the brake mounting, the apparatus, and the method as described herein.

SUMMARY AND INTRODUCTORY DESCRIPTION OF THE INVENTION

The invention is based on the idea of measuring a deformation or displacement caused by the brake force effect of a part of the brake mounting in a direction perpendicular to the axial direction of the brake disk, for which the relative movement of two sensor elements of a sensor device, which are both disposed on the brake mounting, is measured. The measured relative movement can then be used as a measurement variable for the acting brake force or the acting brake torque or the actual coefficient of friction or an inclination angle of the vehicle.

The fact that each of the two sensor elements is disposed on the brake mounting means here that each sensor element is integrated in the brake mounting or is directly mounted on the brake mounting or is rigidly joined to the brake mounting by means of a connecting means or is rigidly attached to the brake mounting. Here the attachment or joint can be implemented reversibly or irreversibly.

As the sensor device is fully disposed on the brake mounting, the invention provides the advantage that the sensor device can be simply and thus inexpensively mounted. Thus e.g. an arrangement of the two sensor elements in a prefabricated subunit (e.g. a cartridge) is also possible, which then only needs to be attached to the brake mounting. The alignment or adjustment of the two sensor elements during assembly of the disk brake, which is necessary if one of the sensor elements is attached to the brake mounting and the other sensor element is attached to the housing of the brake caliper, is thus not necessary.

Preferably, one of the two sensor elements is disposed on the brake mounting in such a way that the sensor element undergoes essentially no displacement or movement in a direction perpendicular to the axial direction of the brake disk under the effect of a brake force. For this purpose the sensor element is advantageously disposed on a part of the brake mounting on the vehicle side. At the same time, the other of the two sensor elements is disposed on the part of the brake mounting that is displaced or deformed by the effect of the brake force in a direction perpendicular to the axial direction of the brake disk, and the sensor element undergoes a displacement or movement in a direction perpendicular to the axial direction of the brake disk as a result of the effect of the brake force. For this purpose said sensor element is advantageously disposed on a part of the brake mounting facing away from the vehicle.

Preferably, a displacement of a lining guide rail of the brake mounting in a direction perpendicular to the axial direction of the brake disk is measured. Because the lining guide rail is firmly attached to the vehicle on one side via the brake mounting, i.e. its position is fixed, and extends over the brake disk, the lining guide rail undergoes a relatively large displacement in the area of its outer end (facing away from the vehicle), which can be detected by means of the sensor device, as the two sensor elements are disposed on the two said areas of the lining guide rail. The lining guide rail can thus be simply used as part of the measurement principle.

The sensor device preferably comprises a stiff sensor body, which is rigidly joined on one side to a part of the brake mounting and to which one of the two sensor elements is attached. The sensor body then corresponds to an aforementioned connecting means. The stiff sensor body can thus project, similarly to a measurement pointer, a position or a movement/deformation of the part of the brake mounting to another point on the brake mounting, in whose surroundings the other sensor element is located. The part of the brake mounting to which the sensor device is clamped on one side is particularly preferably a lining guide rail. In order to achieve adequate measurement resolution, the sensor element is advantageously attached in an area of the free end of the sensor body.

For reasons of adequate measurement resolution, it is preferable that the sensor body extends along a lining guide rail above the brake disk in order to thereby detect as large as possible a displacement/deformation of the lining guide rail.

Preferably, a displacement of a part of the brake mounting in the direction of the tangentially acting frictional force is measured.

In order to protect the sensor device against external influences or disturbance fields, the sensor device is preferably at least partly disposed in an inner bore of a lining guide rail. Particularly preferably, the sensor body is at least partly disposed in the inner bore. Likewise it is particularly preferable that the first and the second sensor elements are disposed in an inner bore of a lining guide rail. Alternatively, the first and the second sensor elements are particularly preferably disposed in a protective cap attached to the end of a lining guide rail facing away from the vehicle.

According to an advantageous development of the brake mounting according to the invention, the sensor body is attached to the brake mounting with one of its ends in the area of the attachment of the brake mounting on the vehicle side, the first sensor element is disposed at the other end of the sensor body and the second sensor element is disposed in an area of the end of a lining guide rail facing away from the vehicle.

According to another advantageous development of the brake mounting according to the invention, the sensor body is attached at one of its ends to the end of a lining guide rail facing away from the vehicle (outboard direction), the second sensor element is disposed on the other end of the sensor body and the first sensor element is disposed on the brake mounting in the area of the attachment of the brake mounting on the vehicle side.

The first and the second sensor elements of the sensor device preferably operate together according to a magnetic measurement principle. Magnetic measurement principles are advantageous, because they operate contactlessly and can thus also be used in harsh ambient conditions.

According to a development of the invention, the two sensor elements of the sensor device are implemented as an active (measurement value detector) and a passive (transducer) sensor element. In order to implement the electrical connection of the active sensor element to a control unit or an evaluation unit very simply and reliably, it is preferable that the active sensor element is disposed on a part of the brake mounting, i.e. essentially positionally fixed, on the vehicle side.

According to a preferred embodiment of the invention, one of the lining guide rails supports a permanent magnetic or ferromagnetic means, which can be viewed as a second sensor element of the sensor device. A displacement of the magnetic means is detected by at least one magnetically sensitive element (first sensor element) disposed in or on the sensor body of the sensor device. The means are particularly preferably a permanent magnet or a permanent magnetic multi-pole structure, which represents a transducer of the sensor device. According to another particularly preferable alternative, the means are a periodic ferromagnetic structure, e.g. in the form of a toothed structure, which together with a permanent magnet represents a transducer of the sensor device. Here the permanent magnet is advantageously disposed in the sensor body of the sensor device.

The invention also relates to an apparatus with a brake mounting according to the invention.

According to a development of the invention, brake control of the disk brake is carried out directly using the measured displacement. Thus no conversion of the measured displacement into a brake force or a brake torque is necessary. Alternatively, brake control of the disk brake is carried out using a brake control variable computed from the measured displacement. A brake control variable of the disk brake is understood to mean a variable that represents a measure of the operation of the disk brake. For example a brake pedal operating angle or travel, or a brake pressure in the case of a hydraulically operated disk brake, or a motor current in the case of an electromechanically operated disk brake can be used as a brake control variable.

The sensor device is preferably connected to a control unit, which carries out brake control using the measurement signal of the sensor device. Particularly preferably, the control unit comprises processing logic for determining a brake control variable or an acting brake force or an acting brake torque using the measurement signal of the sensor device.

Preferably, a sensor device is disposed on the disk brake, with which a displacement of the part of the brake mounting in a direction perpendicular to the axial direction of the brake disk relative to at least a part of the sensor device is measured. Particularly preferably, said part of the sensor device is attached to the brake mounting with only one of its ends.

The brake mounting comprises preferably at least two lining guide rails extending over the brake disk, on which at least one of the two friction linings is disposed and mounted on a friction lining support. A displacement of one of the lining guide rails in a direction perpendicular to the axial direction of the brake disk is detected by means of the sensor device. In order to be able to detect the largest possible deformation or displacement, the sensor device particularly preferably measures a displacement on or in the area of the (vehicle) outer friction lining support.

According to a preferred embodiment of the apparatus, the brake mounting is implemented in such a way that during clamping or release of the disk brake it has a characteristic between a brake control variable and the displacement, which has a detectable change of its curve for at least one characteristic value of the displacement. Said characteristic value or the change of the characteristic curve can be used for checking the actual state of the disk brake or for correction of the measured displacements. Advantageously, the characteristic point(s) of the change of the characteristic curve, which is/are independent of the wear on the brake or vary/varies in a known manner, enable(s) adaptation of the measured displacements to the friction lining wear of the brake. Using the characteristic point(s), a learning process is preferably carried out for the actual characteristic to take into account the friction lining wear. The characteristic between the brake control variable and the displacement is preferably influenced or determined by the implementation of the lining guide rails and the mounting of the friction lining support on the lining guide rails. Particularly preferably, the lining guide rails and the mounting of the friction linings on the lining guide rails (friction lining support, hammerhead mounting) are implemented in such a way that the characteristic has a characteristic value at which a detectable change of the curve of the characteristic occurs. The detectable change of the curve is advantageously an abrupt change of the gradient of the characteristic.

Preferably, the disk brake is a hydraulically operated disk brake. The characteristic is then determined by measuring the wheel brake pressure (brake control variable) and the associated displacement. This is advantageous, because the wheel brake pressure can simply be measured by a pressure sensor, which is normally already present in a brake installation.

It is however also preferable that the disk brake is an electromechanically operated disk brake. A motor current or a spindle position of the electromechanical actuator of the disk brake is then particularly preferably used as a brake control variable.

According to an advantageous development of the apparatus according to the invention, one of the friction linings can be brought into engagement with the brake disk directly by an actuating unit and the other friction lining can be brought into engagement with the brake disk by the action of a reaction force applied by the housing of the brake caliper.

Electronic control of the disk brake is preferably carried out using the measured displacement or a brake control variable derived from the measured displacement.

During braking, i.e. when the motor vehicle is being decelerated, the measured displacement or the brake control variable derived therefrom represents a measure of the acting brake force, as long as there is no slippage or sliding of the wheel associated with the disk brake.

For operation of the disk brake with the motor vehicle stationary (stopping the motor vehicle on a highway), a downgrade force or an inclination angle of the motor vehicle is preferably derived from the determined displacement, because the displacement under said conditions represents a measure of the downgrade force acting on the motor vehicle.

If the wheel slips or slides, which can be detected e.g. using the wheel slip of the wheel, then the actual coefficient of friction between the road surface and the wheel is preferably concluded from the determined displacement.

According to a preferred development of the method according to the invention, a characteristic of the brake mounting is specified and/or an actual characteristic of the brake mounting is determined or checked during the operation of the disk brake, wherein the characteristic represents the relationship between a brake control variable and the displacement during clamping or release of the disk brake. Particularly preferably, an evaluation of the characteristic is carried out to detect at least one characteristic value of the characteristic at which a detectable change of the characteristic curve occurs. Advantageously, the change of the curve is an abrupt change of the gradient of the characteristic at a characteristic value of the displacement. Said characteristic point of the characteristic is advantageously used as a reference point in the event of a variation of the characteristic, e.g. the variation of the gradient of the characteristic, over the course of time owing to friction lining wear.

In the case of a hydraulically operated disk brake, the characteristic is advantageously determined or checked by measuring or specifying a wheel brake pressure and measuring the associated displacement. For an electromechanically operated disk brake, advantageously a motor current or a spindle position of the electromechanical actuator of the disk brake and the associated displacement are measured to determine or check the characteristic.

The curve of the characteristic between the brake control variable and the displacement is preferably determined by the structural implementation of the lining guide rails and the mounting for the friction linings on the lining guide rails.

Using the determined actual characteristic, a correction of a measured displacement for friction lining wear is preferably carried out. The corrected displacement is then particularly preferably used for brake control of the disk brake.

The actual characteristic of the brake mounting is preferably determined with the aid of the characteristic value of the displacement or is evaluated for correction of the measured displacement.

The characteristic value of the characteristic preferably represents a point of the characteristic at which the gradient of the characteristic changes abruptly. The characteristic value can thus be simply determined by evaluation.

A brake control variable is preferably determined from a measured displacement using the specified or determined characteristic of the brake mounting.

Electronic brake control of the disk brake is then advantageously carried out using the determined brake control variable.

For electronic brake control of the disk brakes of the wheels of a vehicle axle of the motor vehicle, preferably for each disk brake of the vehicle axle, a displacement of at least one part of the brake mounting in a direction perpendicular to the axial direction of the brake disk caused by a brake force effect is measured, and the measured displacements of the disk brakes are then used for brake control. The displacements can be used directly for brake control of the disk brakes of a vehicle axle; it is not necessary to determine brake control variables from the displacements, because the relative circumferential forces (i.e. the ratio of the magnitudes of the circumferential forces of the two brakes) are essentially relevant for control, and are essentially the same for the individual disk brakes and are determined simultaneously. Particularly preferably, during brake control additional brake control variables and/or wheel revolution rates and/or axle accelerations of the corresponding wheels are taken into account in order to be able to detect any differences between the wheels using causality calculations and if appropriate to at least partly correct them.

BRIEF DESCRIPTION OF THE DRAWINGS

Other preferred embodiments will become apparent from the dependent claims and the subsequent description using figures.

The figures show schematically:

FIG. 5 shows a section of a second example embodiment of an apparatus according to the invention, FIG. 6 shows a section of a third embodiment of an apparatus according to the invention, FIG. 9 shows a section of a fourth example embodiment of an apparatus according to the invention, FIG. 10 shows a section of a fifth example embodiment of an apparatus according to the invention, FIG. 11 shows sections of three further example embodiments of an apparatus according to the invention.

DETAILED DESCRIPTION OF THE INVENTION

Figure 1:
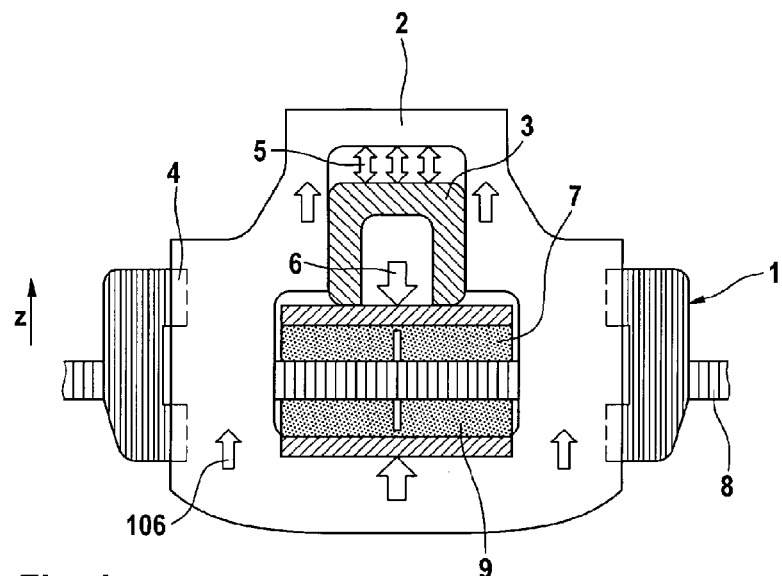
FIG. 1 shows a conventional floating caliper disk brake with a view from above of the caliper bridge of the brake caliper housing.

In FIG. 1 is a schematic illustration of a conventional floating caliper disk brake with a view from above of the caliper bridge of the brake caliper housing. The floating caliper disk brake essentially comprises two components, a brake mounting 1 and a housing of the brake caliper 2, in which according to the example a brake piston 3 with a sealing ring as a component of an actuating unit for direct operation of an (inner) friction lining 7 is accommodated. The housing of the brake caliper 2 is mounted in area 4 on the brake mounting 1, e.g. for attachment to the wheel support of the motor vehicle, e.g. by means of suitable guide bolts and in a conventional manner and so as to be able to slide axially. The housing of the brake caliper 2 overlaps a brake disk 8 with its rear caliper area, wherein the housing of the brake caliper 2 overlaps two friction linings 7, 9 disposed on both sides of the brake disk 8. As already mentioned, an actuating unit is integrated in the brake caliper housing 2 on the inner brake disk side, so as to enable a brake clamping force to be exerted on the friction lining 7. Here the actuating unit preferably comprises a brake piston 3, which can be operated hydraulically, electrically or electromechanically. When operating the brake, e.g. in the case of a hydraulically operated disk brake by generating a hydraulic brake pressure 5, a piston force 6 first acts on the inner friction lining 7 and presses the same against the brake disk 8 after overcoming an air gap. The (outer) friction lining 9 disposed opposite the inner friction lining 7 on a stub of the brake caliper housing 2 is likewise forced against the brake disk 8 in a known manner in response to the operation of the inner friction lining 7 by axial displacement of the brake caliper housing 2 in a direction 106 (in the z-direction). The same pressing force/clamping force acts on both sides of the brake disk 8. Following release of the brake, the air gap between the friction linings 7, 9 and the brake disk 8 is restored by a restoring force of the sealing ring. In the event of friction lining wear, the brake piston 3 pushes further through the sealing ring depending on the degree of wear, wherein the air gap is automatically readjusted in each case.

Figure 2:
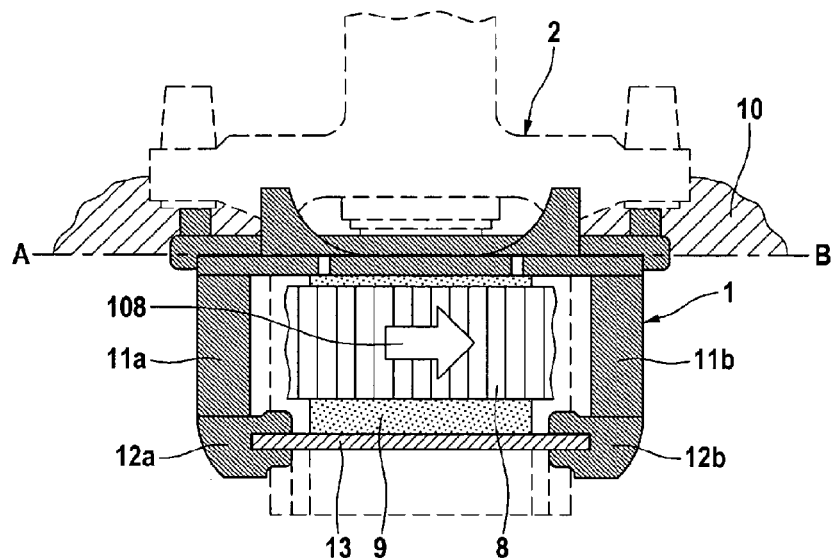
FIG. 2 shows a brake mounting of a floating caliper disk brake in a non-operated state.

In FIG. 2 a conventional floating caliper disk brake is schematically illustrated in a non-operated state with a view from below of the brake mounting. Here components of the brake mounting 1 are shown closely hatched, the housing of the brake caliper 2 located behind is shown dashed. The brake mounting 1, which comprises the two lining guide rails 11a, 11b, is solidly joined to the wheel support or to the chassis of the vehicle 10 in plane A-B, e.g. by bolting. The outer (disposed on the stub side) friction lining 9 is attached to a friction lining support 13 and is guided according to the example in hammerhead mountings 12a, 12b of the lining guide rails 11a, 11b. The brake disk 8 rotates in the direction indicated by the arrow 108 (x-direction, perpendicular to the axial z-direction). No forces are transferred between the housing of the brake caliper 2 and the wheel support or chassis of the vehicle 10. The two lining guide rails 11a, 11b of the brake mounting 1 are aligned in parallel and axially (in the z-direction).

Figure 3:
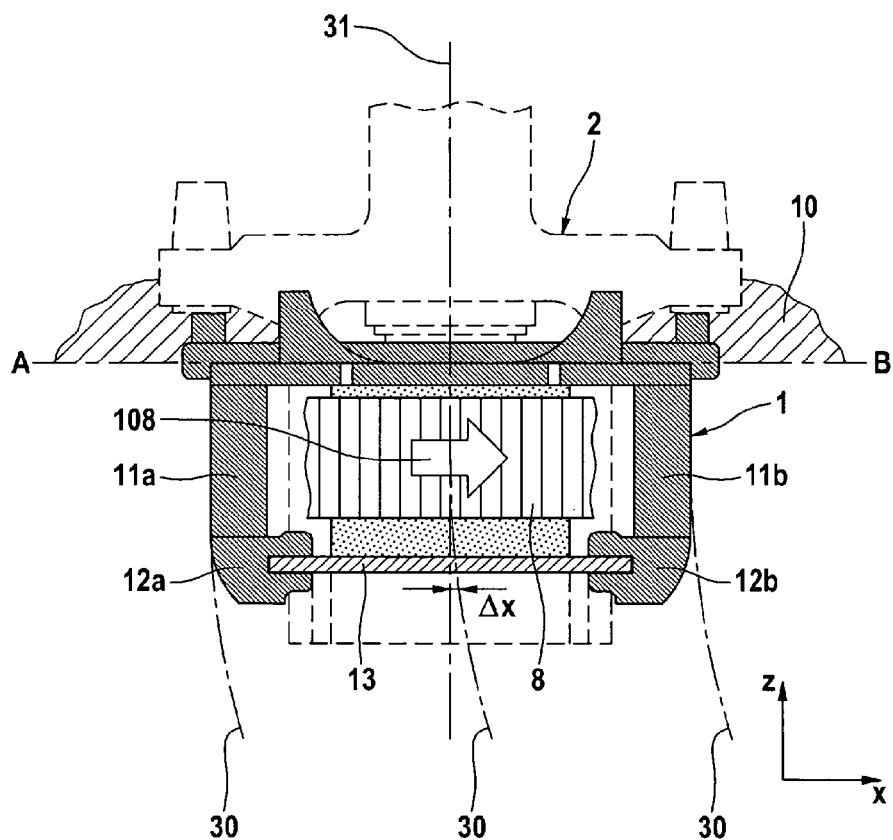
FIG. 3 shows a brake mounting of a floating caliper disk brake in an operated state.

FIG. 3 shows the floating caliper disk brake of FIG. 2 in an operated state, i.e. during braking, e.g. at maximum possible brake pressure prior to the onset of locking. A frictional force on the outer friction lining 9 generated during braking acts tangentially in arrow direction 108. As a result the lining guide rails 11a, 11b of the brake mounting 1 in the area of the friction lining support 13 are "carried along" and a deformation/shearing of the brake mounting 1 occurs in a direction perpendicular to axis 31 (i.e. in the x-direction). The deformation/shearing of the brake mounting 1 is indicated with the curved lines 30. The axis 31 corresponds to the axial direction of the disk brake (z-direction, direction of the clamping force).

According to the example, a shearing/deflection of one or a plurality of elements of the brake mounting 1 in the x-direction is measured by means of a sensor device and an acting brake force or an acting brake torque is determined from the measured shearing/deflection. For example, the measurement signal of the sensor device is forwarded to processing logic, e.g. in a controller of the brake installation, and a brake force or a brake torque is calculated from the measurement signal in the processing logic.

A measure of the acting brake force $F_B$ or the acting brake torque $M_B$ is determined using the deformation of the brake mounting 1 or of parts 11a, 11b of the brake mounting 1 in a direction tangential to the surface of the disk brake caused by the frictional force (i.e. perpendicular to the expansion of the brake caliper evaluated in a known manner for determination of the clamping force, which occurs in the direction perpendicular to the surface of the brake disk (axially)). This gives the advantage of a simple measurement of the tangential force component on essentially the outer friction lining support, without additional mechanical framework structures or similar being necessary.

/friction lining support 13/lining guide rail 11b is used as a measurement spring. In the area of the friction lining support 13 or the hammerhead mounting 12a, 12b, the lining guide rails 11a, 11b are deformed/deflected during braking by an amount Δx, which is dependent on the acting brake torque, relative to their alignment in the unbraked state (parallel to axis 31).

In practice the housing of the brake caliper 2 follows the displacement path of the lining guide rails. This is not illustrated in FIG. 3. The deformation/shearing of the brake mounting 1 is shown schematically exaggerated in FIG. 3.

A displacement travel Δx of the brake mounting 1 is measured according to the invention by a suitable sensor device. For this purpose different measurement methods can be used, e.g. magnetic, capacitive or optical measurement methods come under consideration.

Advantageous example embodiments are explained below.

Figure 4:
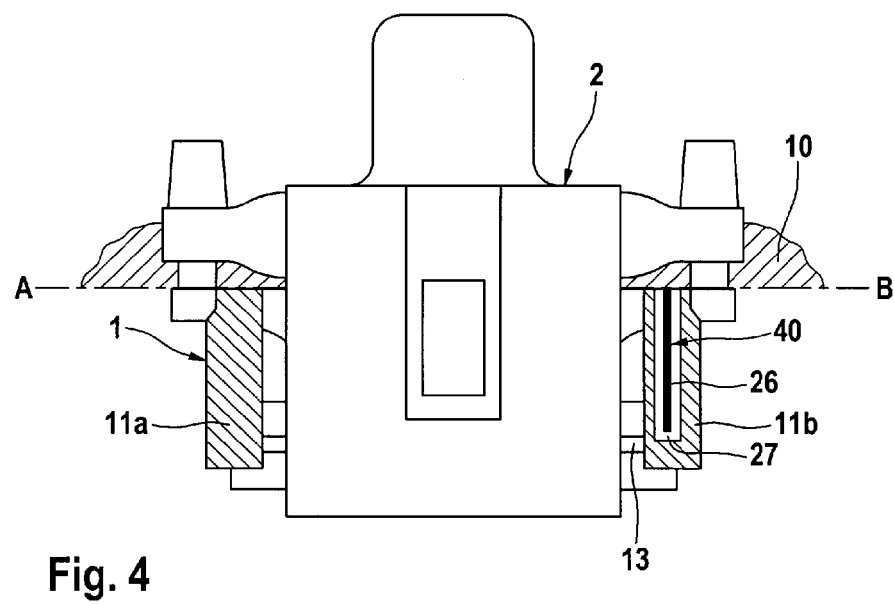
FIG. 4 shows a first example embodiment of an apparatus according to the invention.

A first example embodiment of an apparatus according to the invention, comprising a brake mounting 1 with sensor device 40 and a housing of the brake caliper 2, is schematically illustrated in FIG. 4. The brake mounting 1, which comprises two lining guide rails 11a, 11b, is solidly connected in plane A-B to the wheel support or the chassis of the vehicle 10, e.g. by bolting. At least one of the lining guide rails, according to the example lining guide rail 11b, is provided with an inner bore 27, essentially emanating from plane A-B, in whose cavity is introduced a sensor device 40 with one or a plurality of suitable magnetically, capacitively or optically sensitive sensor elements (not shown) on a rigid sensor mounting body 26. Advantageously, the magnetically, capacitively or optically sensitive sensor element(s) is/are inserted up to close to the end of the lining guide rail 11b, in order to detect as large a transverse displacement Δx as possible. During braking the sensor mounting body 26 remains fixed in position, e.g. orthogonally aligned relative to the attachment plane A-B (no deformation), whereas the lining guide rail 11b is deformed relative to the mounting body 26. The change in a distance between the mounting body 26 and the lining guide rail 11b or a relative displacement between the mounting body 26 and the lining guide rail 11b is determined by means of the magnetically, capacitively or optically sensitive sensor elements. For example the lining guide rail 11b itself can be used as a transducer for the sensor device. According to one example embodiment, a measuring scale, e.g. a magnetic one, is disposed in the inner bore 27, e.g. on the end face of the inner bore 27.

An advantage of the first example embodiment consists of the potential clean room environment for the sensor device 40 with simultaneous mechanical protection of the sensor device 40. In particular this enables a sensor device to be based on an optical measurement principle.

FIG. 5 shows a section of a second example embodiment of an apparatus according to the invention. A lining guide rail 11b of the brake mounting 1, which is mechanically solidly joined to the chassis of the vehicle 10 in plane A-B, e.g. by a not illustrated fixing element, is shown schematically. The lining guide rail 11b is provided with a bore 27, in which the sensor device 40 is disposed. The sensor device 40 comprises a first sensor element 35, a second sensor element 36 and a sensor body 26, which is in the form of a rigid, needle-shaped or tubular rod. The sensor body 26 is mechanically solidly joined to the lining guide rail 11b below plane A-B and protrudes into the bore 27. The first sensor element 35 is attached to the end of the sensor body 26 facing away from the vehicle and the second sensor element 36 is attached to the lining guide rail 11b in the end region of the cavity 27 facing away from the vehicle chassis 10. First and second sensor elements 35, 36 represent two corresponding partial components of a sensor system for detection of a relative movement or a displacement travel between the two sensor elements 35, 36. The sensor elements 35, 36 interact with each other via a field coupling and are separated by an air gap.

Advantageously, the sensor element 35 is an electrophysically active sensor element (measurement value detector element) and the sensor element 36 is an electrophysically passive measuring scale (transducer element), so that the electrical connecting lines of the sensor element 35 can be fed via the sensor body 26 to an electronic signal processing stage 37 and then via a signal line 38 to a controller.

In FIG. 5, the apparatus according to the example is shown in the case of no acting brake force (F=0) and in FIG. 5 b) in the case of an acting brake force ($F_{max}$). Because lining guide rail 11b is mechanically solidly joined on one side to the vehicle chassis 10, which is not subject to any positional displacement in the x-direction under the influence of an acting brake force, and because as described above lining guide rail 11b is deformed/sheared by the frictional force in the x-direction generated during braking (tangential to the surface of the disk brake), lining guide rail 11b can be used as a flexural spring. As it were the deflection of the lining guide rail 11b under force $F_{max}$ (at the sensor element 36), advantageously essentially at the position of maximum deflection, is compared by the sensor device 40 with the deflection at a reference point 49 in plane A-B. For this purpose, reference point 49 is mechanically "shifted" via the rigid sensor body 26 with sensor element 35 into the area of sensor element 36 (advantageously the position of maximum deflection) and is spatially mechanically overlaid by the same, in such a way that the sensor components 35, 36 can reliably interact electrophysically.

As is indicated schematically in FIG. 5 b), in the general case plane A-B of the essentially positionally fixed vehicle chassis 10 is very slightly curved under the action of the force $F_{max}$ and hence the sensor body 26 is inclined by angle $\alpha_1$ (close to zero) relative to the vertical (in the case of F=0).

At the same time, the lining guide rail 11b with sensor element 36 bends by angle $\alpha_2$. Thus the sensor elements 35, 36 are displaced relative to each other by the difference $\Delta\alpha=(\alpha_2-\alpha_1)$ or by the corresponding degree of curvature, equivalent to the relative displacement travel Δx. The smaller the curvature of the plane A-B, the greater is the power of sensor discrimination and this reaches a maximum in the ideal case at $\alpha_1=0$.

FIG. 6 shows a section of a third example embodiment of an apparatus according to the invention. Schematically illustrated is lining guide rail 11b of the brake mounting 1 according to the example, which in plane A-B is mechanically solidly joined to the chassis of the vehicle 10, e.g. by means of a fixing element that is not shown. The lining guide rail 11b is provided with a bore 27, in which sensor device 42 is disposed. The sensor device 42 comprises a first sensor element 35, a second sensor element 36 and a sensor body 26', which is in the form of a rigid, needle-shaped or tubular rod. The sensor body 26' is mechanically solidly joined to the end of the lining guide rail 11b facing away from the vehicle (10) and protrudes towards the vehicle into the bore 27. The second sensor element 36 is attached to the end of the sensor body 26' facing towards the vehicle (10). The first sensor element 35 is disposed in cavity 27 in the area 49a of the lining guide rail 11b fixed to the chassis. Here too the first and second sensor elements 35, 36 represent two corresponding partial components of a sensor system for detecting a relative movement or a displacement travel between the two sensor elements 35, 36. The sensor elements 35, 36 act on each other via a field coupling and are separated by an air gap.

In FIG. 6 a) the apparatus according to the example is illustrated in the case of no acting brake force (F=0) and in FIG. 6 b) in the case of an acting brake force ($F_{max}$). Here too the lining guide rail 11b is used as a flexural spring. Its deflection under the force $F_{max}$ is compared with the deflection at the reference point 49a in or below plane A-B (49), which is essentially positionally fixed (apart from a possible very small curvature) under the action of the force $F_{max}$. For this purpose, the deflection is mechanically "shifted" to reference point 49a via sensor body 26' with sensor element 36 and spatially mechanically overlays the same in such a way that the sensor components 35, 36 can reliably interact electrophysically.

In the general case plane A-B of the essentially positionally fixed vehicle chassis 10 is very slightly curved under the effect of force $F_{max}$. The curvature of the lining guide rail 11b, which is joined on one side to the chassis of the vehicle 10, leads to an angle difference Δα of the relative position of the sensor elements 35, 36, which is measured by means of the sensor elements 35, 36.

Advantageously, sensor element 35 is an electrophysically active sensor element (measurement value detector element) and sensor element 36 is an electrophysically passive measuring scale (transducer element). An advantage of the third example embodiment consists in that the electrophysically active sensor element 35 can be directly disposed on a circuit board 37.

Figure 7:
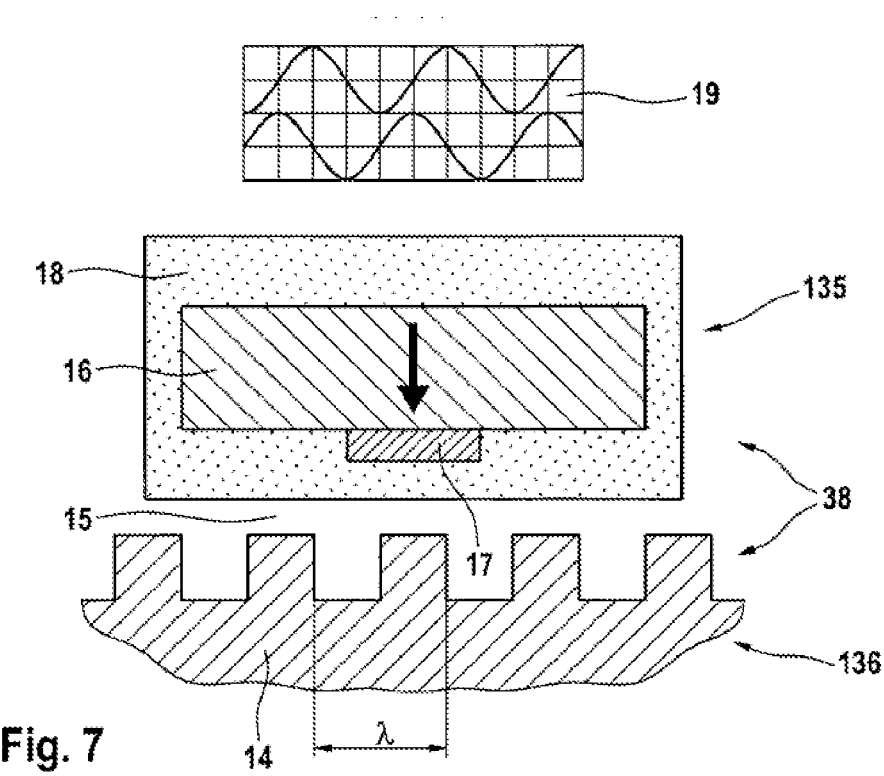
FIG. 7 shows a measurement principle of an example of a sensor device of a brake mounting according to the invention.

A measurement principle of an example sensor device 38 of an apparatus according to the invention is illustrated schematically in FIG. 7. In this case it is a magnetic measurement principle. One or a plurality of parts of the brake mounting 1, advantageously the lining guide rail 11b, is/are of ferromagnetic form. The part or parts is/are provided with a toothed structure 14 with a periodic length λ (e.g. λ=2 mm) as a type of measuring scale. A permanent magnet 16 couples to said ferromagnetic toothed structure 14 by means of an air gap 15. The ferromagnetic toothed structure 14 represents, under the influence of the permanent magnet 16, a transducer element 136 ((second) sensor element) of the sensor device 38. A sensor element structure 17 of magnetically sensitive elements is disposed in a positionally fixed manner in a housing 18 in the magnetic field between the toothed structure 14 and the permanent magnet 16, i.e. the measurement value detector element 17 of the sensor device 38 or the housing 18 is designed in such a way and is disposed on the brake mounting 1 so that it is not deformed/deflected under braking, especially not in the x-direction. The sensor element structure 17 corresponds to a (first) sensor element 135 of the sensor device 38. The magnetically sensitive elements are e.g. technically formed on the basis of XMR effects (generally magnetoresistive effects) or of the Hall Effect in such a way that they enable a definite correctly signed measurement of a displacement travel Δx in relation to the periodic length λ. In an advantageous example embodiment, the measurement value detector element 17 contains two AMR bridges (AMR: anisotropic magnetoresistive effect), which are internally positionally offset relative to each other by a quarter of the periodic length λ/4 and are aligned in such a way that two sinusoidal orthogonal signals 19 are generated by the two AMR bridges which when divided by one another using the tangent function are a measure of the displacement travel Δx.

Instead of a transducer element consisting of a ferromagnetic toothed structure 14 and a permanent magnet 16, according to another example that is not shown a permanent magnetic structure of alternating north/south poles (magnetized encoder track) with periodic length λ is used as a measuring scale or transducer element 136, wherein a periodic length is understood in each case to be a north/south pole pair. The measurement value detector element 17 of magnetically sensitive elements can be formed as explained using FIG. 7.

Figure 8:
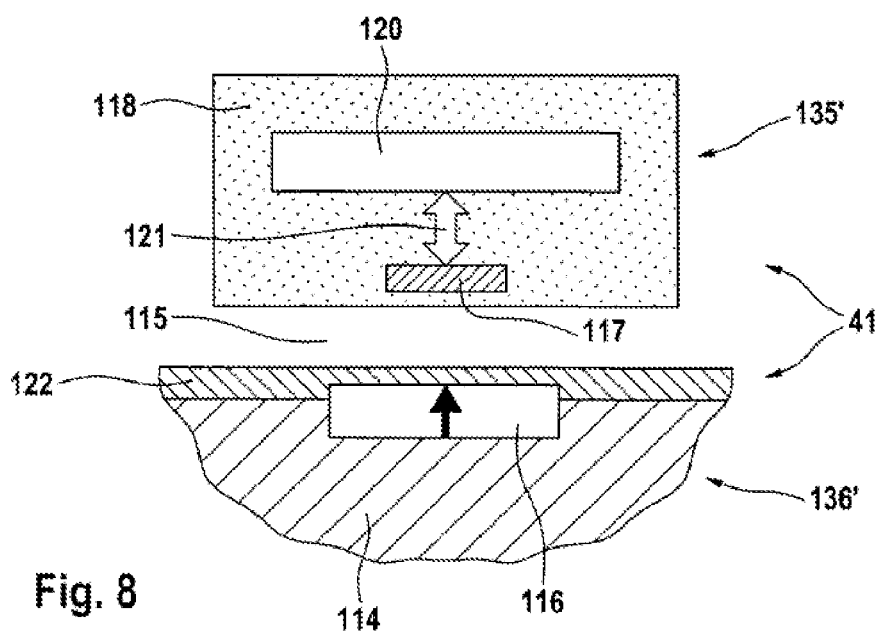
FIG. 8 shows a measurement principle of a further example of a sensor device of a brake mounting according to the invention.

In FIG. 8 another example embodiment of a sensor device 41 for an apparatus according to the invention is schematically illustrated. A permanent magnet 116 is used as a measuring scale, which is embedded with one pole (according to the example with its south pole) in a ferromagnetic element 114 of the brake mounting 1, advantageously the ferromagnetic lining guide rail 11b, in a magnetically short circuit free manner, and whose other pole (according to the example the north pole) is protected against mechanical influences by a magnetically inactive coating 122. The permanent magnet 116, as a transducer element 136' ((first) sensor element) of the sensor device 41, is coupled by an air gap 115 to a sensor element structure 117 of magnetically sensitive elements, which is incorporated as a measurement value detector element 135' ((second) sensor element) in a housing 118, which is disposed in a positionally fixed manner on the brake mounting in such a way that it is not significantly deformed/deflected under braking, especially not significantly in the x-direction. According to the example, the sensor element structure 117 is connected via line connections 121 to an integrated electronic evaluation circuit 120.

According to another example embodiment that is not shown, a sensor device does not use an individual permanent magnet 116 (as described using FIG. 8) as a measuring scale, but a permanent magnetic multi-pole structure.

The magnetically sensitive elements are advantageously technically designed on the basis of XMR effects (generally magnetoresistive effects), so that they enable a positively correctly signed measurement of a displacement travel Δx of the permanent magnet 116 in connection with a permanent magnetic air gap field of approx. 20 mT. In a particularly advantageous example, the sensor element structure 117 contains two AMR bridges (AMR: anisotropic magnetoresistive effect), which are internally positionally offset relative to each other and are aligned in such a way that two sinusoidal orthogonal signals are generated, which when divided by one another using the tangent function are a measure of the displacement travel Δx.

FIG. 9 shows a section of a fourth example embodiment of an apparatus according to the invention. Here the sensor device 43 is in the form of a cartridge, which can be inserted into a bore 27 in a lining guide rail 11b and can be attached by means of schematically indicated fixing means 51, 52 to the lining guide rail 11b. The cartridge comprises above plane A-B a thin-walled, flexible housing 53, which encloses the sensor body 26 and simultaneously accommodates sensor element 36 in its top end and this opposes the sensor element 35 with a defined air gap. The cartridge body 54 beneath the plane A-B is rigidly and solidly implemented and contains at the same time the necessary signal processing stage 37a. An advantage of the sensor device as a cartridge consists of the option of separate manufacture, calibration, correction value determination and testing of the sensor device prior to its installation in the lining guide rail 11b.

FIG. 10 shows a section of a fifth example embodiment of an apparatus according to the invention. According to the example, the sensor body 26 with sensor element 35 protrudes out of the bore 27 of the lining guide rail 11b. The sensor element 36 of the sensor device 44 is disposed in a cap 56, which for its part is connected or can be connected by a suitable mechanical connection to the lining guide rail 11b. The cap 46 consists of a material that does not affect the sensing process in a disturbing manner. Besides the embodiment variant illustrated in FIG. 10 with cap 56, an implementation with a cartridge protruding out of the bore 27 is also conceivable, which is then particularly advantageous if the sensor elements 35, 36 are not to be mounted inside the bore 27 on technical grounds or the metallic surroundings of the lining guide rail 11b adversely affect the sensing effect. Example embodiments with a protruding sensor body 26 give the additional advantage of mechanically amplifying small deflections of the lining guide rail 11b by suitable selection of the cap height (or cartridge length) according to the principle of the extended measurement pointer.

In the example embodiments of FIGS. 5, 6, 9 and 10 the sensor elements 35, 36 are disposed perpendicularly to the brake disk (in the z-direction) and to each other. An advantageous technical implementation consists in that the sensor element 35 is implemented as a magnetoresistive angle measurement element and the sensor element 36 as a permanent magnetic structure adapted thereto. This can e.g. be one of the two poles of a cylindrical or planar permanent magnet, which is aligned to the angle measurement element or a permanent magnetic multi-pole structure, which are designed so that they each generate two orthogonal sinusoidal signals in the internal, mutually positionally offset measurement bridges of the angle measurement element, which when divided by one another using the tangent function are a measure of the angle difference $\Delta\alpha$.

FIG. 11 shows three example embodiments in which the sensor elements 35, 36 are disposed parallel to the brake disk (in the x-direction), i.e. level with each other. Here the sensor element 35 is in its widest sense an electrophysically active field probe and sensor element 36 is an electrophysically passive measuring scale, wherein their movement $\Delta x(F)$ relative to each other is evaluated as a measure of the acting brake force F.

In the example embodiment according to FIG. II a) the sensor body 26 with sensor element 35 protrudes out of the bore 27 of the lining guide rail 11b on the side facing away from the vehicle. The sensor element 36 is disposed in a cap 56, wherein sensor element 35 and sensor element 36 are oriented in the x-direction. Said example is advantageous if the sensor elements 35, 36 are not disposed inside the bore 27 on technical grounds or the metallic surroundings of the lining guide rail 11b adversely affect the sensing effect. For example the sensor element 35 can be implemented as a coil of a resonant circuit and sensor element 36 as a ferrite core, which approaches the coil or is pushed into it to a greater or lesser extent. The shift of the resonant frequency associated with the relative movement $\Delta x(F)$ is evaluated. This can take place with the resonant circuit as part of an oscillator whose resonant frequency is measured or by measuring the variable resonant voltage at constant operating frequency.

The example embodiment of FIG. II b) is similar to the example embodiment of FIG. 5, but with sensor elements 35, 36 oriented in the x-direction. Here the sensor element 35 is in the form of a unidirectional field probe, which is coupled to the metallic surface of the lining guide rail 11b, which is thus used as a measuring scale (sensor element 36) at the same time. The field probe can use both magnetic and also electric fields and can be implemented according to known principles. Known principles for utilizing magnetic field effects are e.g. induction coils, whose unidirectional effects are achieved by using specially shaped ferrite cores, e.g. U-cores, shell cores etc., or even permanent magnetic biased AMR bridges (AMR=anisotropic magnetoresistive) or Hall elements. For utilizing electric fields, sensor element 35 can be implemented as an active or passive planar electrode movable relative to the positionally fixed surface of the lining guide rail 11b in order to produce an active or passive capacitor of variable capacitance, wherein "active" is understood to be the permanent electrical bias using an electret.

The example embodiment of FIG. 11 c) is similar to the example embodiment of FIG. 6 with a sensor body 26' attached to the lining guide rail 11b on the side facing away from the vehicle, but the sensor elements 35, 36 in FIG. 11 c) are oriented in the x-direction. As in the example embodiment of FIG. 11 b), sensor element 35 is in the form of a unidirectional field probe. One advantage of said arrangement consists of the option of the direct mounting of the sensor element 35 on the board 37.

A general advantage of the example embodiments according to FIGS. 5, 6, 9-11 consists in that the sensor elements 35, 36 by installation in metallic surroundings (lining guide rail 11b) are not only mechanically protected, but are also shielded against magnetic and electrical disturbance influences.

Figure 12:
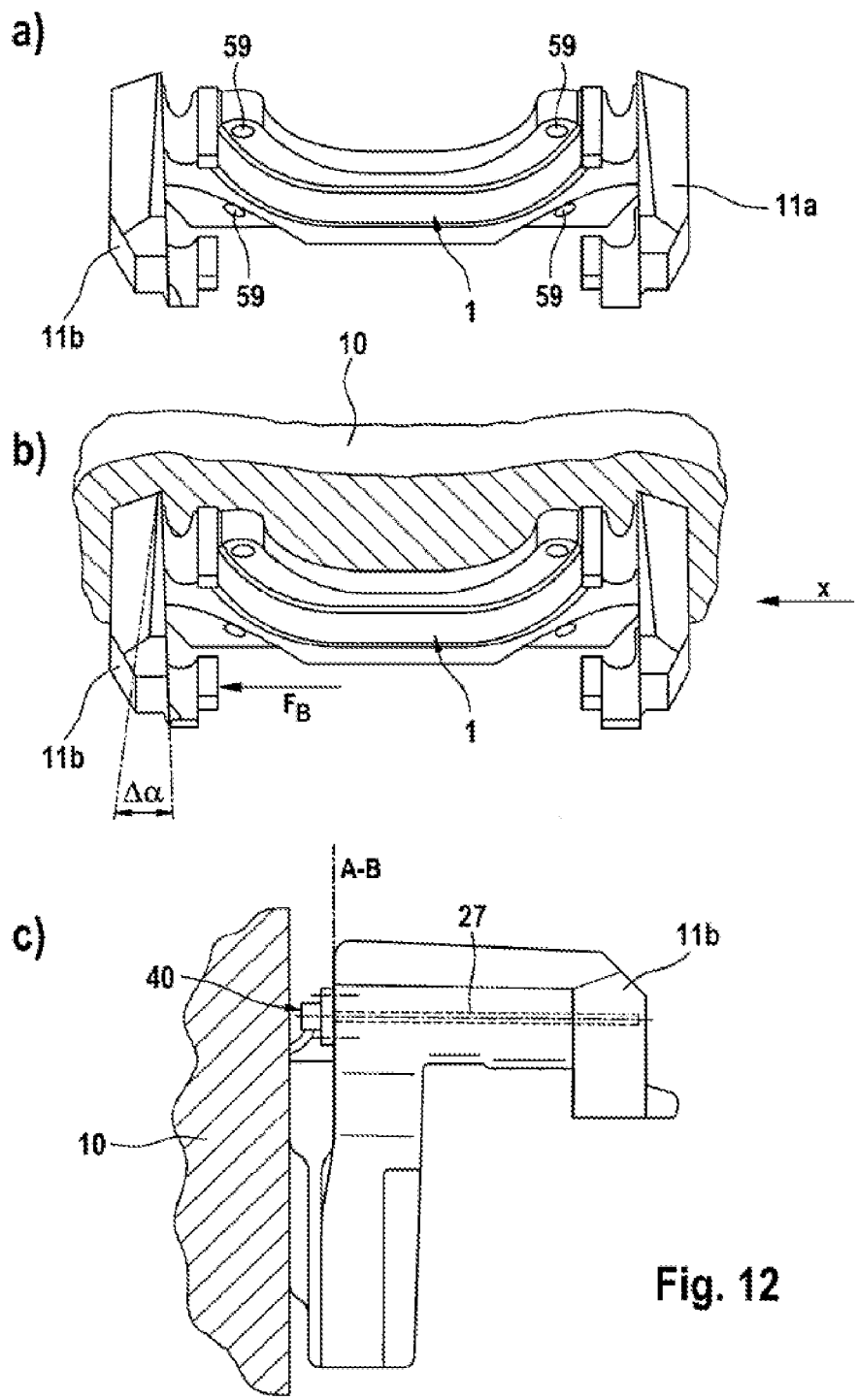
FIG. 12 shows an arrangement of a brake mounting according to the invention on the vehicle chassis.

In FIG. 12 a brake mounting according to the example is shown with a schematically indicated sensor device (brake mounting with sensing function) and its disposition on the vehicle 10. FIG. 12 a) shows a brake mounting 1, which can be bolted to the chassis of the vehicle 10 in a fixed position using fixing holes 59, as illustrated in FIG. 12 b). Chassis 10 undergoes essentially no positional displacement parallel to the brake disk (in the x-direction) under the influence of a brake force $F_B$. The brake mounting 1 comprises two lining guide rails 11a, 11b for the friction lining supports (not shown). As indicated in FIG. 12 c), the lining guide rail 11b is provided with a bore 27, in which sensor device 40 is disposed according to the example. Other embodiment versions of the sensor device are also possible. Under the effect of the brake force $F_B$, the lining guide rails 11a, 11b are bent in relation to the plane A-B, as is illustrated here by way of example for the sensor-equipped lining guide rail 11b as a difference angle $\Delta\alpha$. The illustration is highly exaggerated for clarity. In practice maximum degrees of curvature in the range below 300 μm are to be expected.

Figure 13:
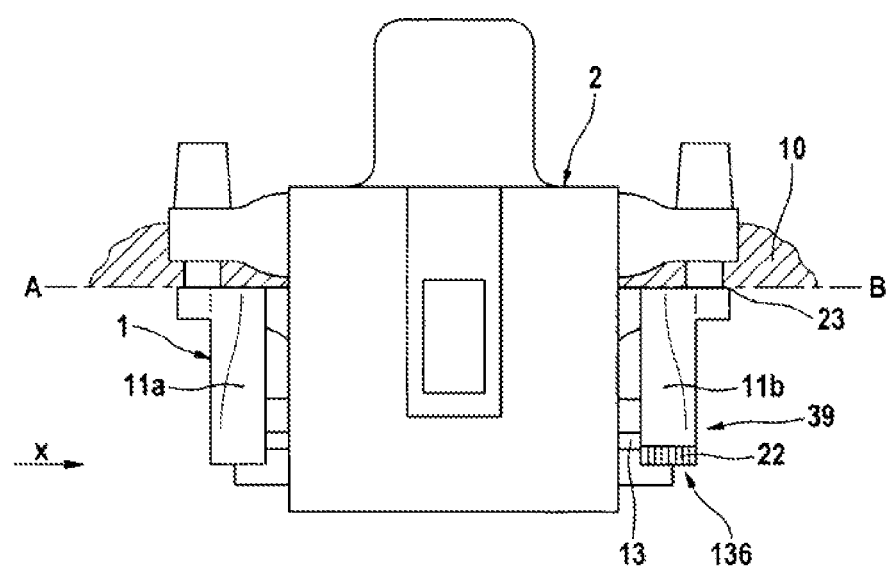
FIG. 13 shows a further example embodiment of an apparatus according to the invention.

Another example of an apparatus according to the invention is schematically illustrated in FIG. 13. The brake mounting 1, which comprises the two lining guide rails 11a, 11b, is solidly joined to the wheel support or the chassis of the vehicle 10 in plane A-B. The lining guide rail 11b is provided with a measuring scale 22, e.g. in the form of a toothed structure. The measuring scale 22 is advantageously disposed on the outer end of the lining guide rail 11b, because the maximum measurable displacement travel $\Delta x$ occurs on the outer end of the lining guide rail relative to the position of the lining guide rail in the unbraked state or relative to a point 23 on the mounting attachment plane A-B, which does not vary (in the x-direction) in the braked and unbraked states. The measuring scale 22 represents a (second) sensor element 136 of a sensor device 39. A measurement value detector element of the sensor device 39 is not illustrated in FIG. 13 for better clarity.

In order to be able to detect the displacement travel Δx of the measuring scale as accurately as possible, the measurement value detector element of the sensor device 39 according to the example is integrated in a mechanically stiff sensor body, whose attachment on the mounting side takes place on the attachment plane A-B, so that the sensor body and hence the measurement value detector element always remains positionally invariant, e.g. orthogonal, relative to the attachment plane A-B, while the measuring scale is displaced relative to the sensor body/measurement value detector element by the elastic lining guide rail depending on the peripheral force (brake force).

Figure 14:
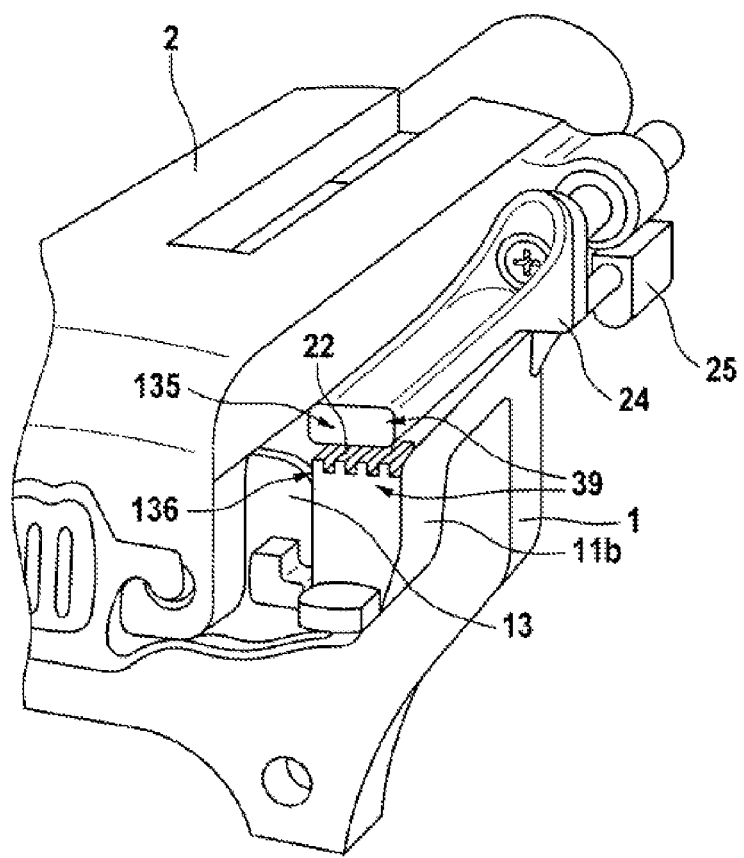
FIG. 14 shows the example embodiment of FIG. 13 with a view of the stub of the disk brake.

In FIG. 14 the example of FIG. 13 is shown with a view of the stub of the disk brake. In contrast to FIG. 13, in FIG. 14 a measurement value detector element of the sensor device 39 comprising sensor body 24 with a plug socket 25 for connection of a sensor cable and sensor element 135 is illustrated. The lining guide rail 11b acts as a measuring spring, which is deformed/displaced under braking, and supports at its end a measuring scale 22 for interaction with the (not shown in detail in FIG. 14) magnetically sensitive elements ((first) sensor element 135), which are disposed in or on the sensor body 24. The sensor body 24 is implemented as mechanically stiff and is fixed to a guide bolt on the mounting side in the attachment plane A-B, so that the sensor body 24 also remains oriented orthogonally to the attachment plane A-B during braking.

Advantageously, the measurement value detector element is protected against mechanical damage by further suitable structural measures.

An advantage of the invention consists in that the brake mounting mechanism 1, 11a, 11b is also used as a sensor mechanism. The brake mounting mechanism is advantageously constructed in such a way that the machine elements involved satisfy both the strength requirements and also at the same time the requirements in relation to the displacement travel Δx measurement resolution.

The stiffness of the brake mounting mechanism, i.e. the relationship (characteristic) between a brake control variable E (e.g. brake pressure p or motor current I or brake pedal position $L_{Pedal}$) and displacement Δx of the brake mounting, is known under test bed conditions at least for a disk brake with unused friction linings from the design or using test measurements. The stiffness of the brake mounting mechanism is likewise known from measurements depending on the effective length of the lining guide rails (i.e. depending on the wear in particular of the outer friction lining) under test bed conditions.

In order to detect shifts of the disk brake characteristic caused by wear during normal driving mode and potentially to be able to make corresponding corrections to the measured displacement Δx, which is to be used for brake control, the elements of the brake mounting mechanism involved are advantageously implemented in such a way that a relationship (a characteristic) between the brake control variable E (e.g. brake pressure p or motor current I or brake pedal position $L_{Pedal}$) and position X (or displacement Δx) of the brake mounting, which has sufficiently distinctive characteristic features or indices, results from the interaction of the elements of the brake mounting mechanism. For this purpose, according to the example the hammer heads of the outer friction lining support 13 are used as a measurement means and are implemented in such a way that their interaction with the hammerhead mountings 12a, 12b of the lining guide rails 11a, 11b causes characteristic behavior (characteristic curve profile) during clamping/release of the brake (push/pull behavior).

Figure 15:
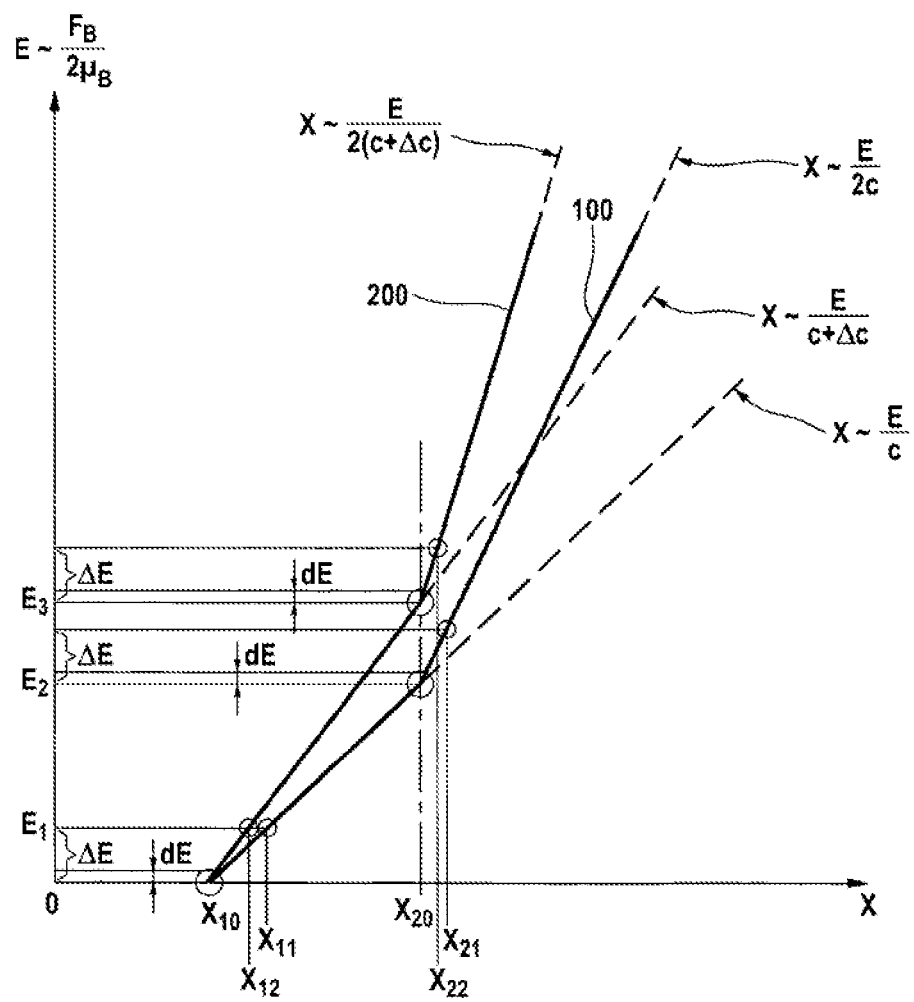
FIG. 15 shows examples of characteristics of an apparatus according to the invention.

An example characteristic 100 of a disk brake according to the example is schematically illustrated in FIG. 15. In the diagram a relationship between a brake control variable E and the position X of the brake mounting, e.g. at the position of a transducer of a sensor device, is illustrated. The position X=0 corresponds e.g. to the unbraked state here, i.e. according to the example position X also represents the displacement travel Δx during braking.

The brake control variable E represents a measure of the operation of the disk brake and is proportional to the quotient of the acting brake force $F_B$ and the coefficient of friction $\mu_B$ between brake disk and the friction linings:

$$E \sim \frac{F_B}{2\mu_B}$$

The resulting displacement X or Δx thus represents a measure of the acting brake force $F_B$. The brake control variable E can be understood e.g. to be the product of the brake pressure p and the piston area A (E=pA) for a hydraulically operated brake. In the case of an electromechanical brake with a control motor, brake control variable E is e.g. a (known) function of the motor current I (E=f(I)). For electrical brakes, brake control variable E can be a (known) function of the brake pedal angle or travel $L_{Pedal}$ (E=f($L_{Pedal}$)).

The position of the characteristic positions $X_{10}$, $X_{20}$ for the characteristics are determined by the implementation of the hammerhead fitting (adjusted push/pull behavior of the hammerhead fitting). The curve of the characteristic 100 will first be described below. Starting with braking from the unbraked state X=0, the brake is applied at position $X_{10}$ and begins in pull mode, i.e. the hammer head being pulled along by the brake disk deforms the first lining guide rail in the pulling direction without the second hammer head contacting its (second) lining guide rail. This results in a curve of the characteristic 100 in the lower region $X_{10}<x<X_{20}$ according to X=E/c, wherein c is the (known) spring constant of the lining guide rails (for a fixed axial position of the outer friction lining support). The geometric play between the second hammer head and its associated lining guide rail is dimensioned so that the second hammer head contacts the second lining guide rail for an increase of the brake control variable E at position $X_{20}$ and then starts its pull mode, i.e. pushed by the brake disk it deforms its lining guide rail in the pressing direction. The deformations of the lining guide rail add to the resulting position/displacement X, therefore X>$X_{20}$ X=E/(2*c) applies for the associated characteristic 100 in the upper region.

Characteristic 100 of the brake mounting can e.g. be measured during manufacture of the brake and stored a control and regulating unit of the brake installation.

The example characteristic 100 has two characteristic values of the displacement $X_{10}$, $X_2$. A further correction of the displacement described below is, however, also possible with only a single characteristic value. For this purpose e.g. the mountings between the lining guide rails and the friction lining support are implemented in such a way that the brake is applied at position $X_{10}$, wherein the same two hammer heads contact the lining guide rails. This results in e.g. a curve of the characteristic with X=E/(2*c) for X>$X_{10}$. The one kink point at $X_{10}$ is sufficient as a characteristic reference point.

The (known) characteristic including the kink points $X_{10}$, $X_{20}$ can be checked/confirmed during driving operation by measuring the brake control variable E (e.g. of the wheel brake pressure p by means of a pressure sensor for a hydraulically operated brake or by the motor current I or the brake pedal operation $L_{Pedal}$) and the displacement $\Delta x$ caused by the associated brake force effect in a direction perpendicular to the axial direction of the brake disk.

Advantageously, the brake mounting/sensor mechanism is designed in such a way that the kink points $X_{10}$, $X_{20}$ of the characteristic 100 and its unavoidable noisiness during driving mode can be reliably detected through a very small difference dE of the brake control variable, i.e. the resolution of the position/displacement travel sensor mechanism is sufficiently high.

Characteristic 100, which corresponds to a novel brake disk, can be stored in a control and regulating unit as a data file and in the form of an algebraic relationship with known parameters (such as e.g. the spring constant c of the lining guide rails). During operation of the brake, pairs of values of the applied brake control variable E and the associated displacement $\Delta x$ are detected and compared with the stored characteristic. If the detected value pairs essentially agree with the characteristic, then the measured displacement $\Delta x$ can be used for brake control without further correction (directly or after conversion to a brake control variable using the (checked) characteristic).

Owing to the gradual wear of the friction linings, the outer friction lining support, which contributes significantly to displacement $\Delta x$, shifts axially towards the brake disk. Consequently, the lengths of the lining guide rail that are effective for measurement are reduced, i.e. the effective spring constant increases from c to c+$\Delta$c. Accordingly, an example characteristic 200, which is illustrated in FIG. 10, now occurs. Here the kink points $X_{10}$, $X_{20}$ of the characteristic 200 are as for the characteristic 100. The curve of the characteristic 100 is given by $X=E/(c+\Delta c)$ in the lower region $X_{10}<X<X_{20}$) and is given by $X=E/(2*(c+\Delta c))$ in the upper region $X>X_{20}$.

If during operation of the brake with a brake control variable $E_1$, the displacement $X_{11}$ is now no longer measured but a smaller displacement $X_{12}$ is measured, then it will be recognized from this that significant brake lining wear has occurred and that the measured displacement $X_{12}$ must be corrected before it can be used for brake pressure control or further evaluation. The actual effective stiffness (c+$\Delta$c) can be concluded from the (known) increase $\Delta E$ of the brake control variable and the associated relative displacement $X_{12}$-$X_{10}$ and is then used for correction of the measured displacement $X_{12}$.

Accordingly, during monitoring of the characteristic it can be determined that the kink in the characteristic at the kink point $X_{20}$ resulting from the wear of the friction linings no longer occurs at a brake control variable $E_2$ but at a brake control variable $E_3$. An increase $\Delta E$ then leads to a reduced (relative to the initial state $X_{21}$-$X_{20}$) relative displacement $X_{22}$-$X_{20}$, from which the actual stiffness (2*(c+$\Delta$c)) can be concluded. The determined stiffness is used for correction of the measured displacement $X_{22}$.

In order to carry out adaptation to the wear of the friction linings, the fact is thus used that the position of the kink points $X_{10}$, $X_{20}$ is retained despite friction lining wear or varies in a known manner. The kink points $X_{10}$, $X_{20}$ can thus continue to be used as characteristic reference points.

The measured or corrected displacement $\Delta x$ or a brake control variable E determined from $\Delta x$ represents a measure of the acting brake force during braking, i.e. if the motor vehicle is decelerating, as long as there is no slipping or sliding of the wheel associated with the disk brake.

In the case of a stationary vehicle and a simultaneously operated brake, e.g. on a hillside, the frictional force of the brake corresponds to the downgrade force. Accordingly, a measurement variable for the inclination angle of the vehicle and/or for the downgrade force acting on the vehicle can be determined from the occurring displacement $\Delta x$.

Furthermore, the invention can be used to determine the actual coefficient of friction between the road surface and the tires, which is especially advantageous at low coefficients of friction (snow, ice). For this purpose the wheel is briefly locked and the measured displacement $\Delta x$ is evaluated as a measure of the occurring frictional force between the road and the tires.

Figure 16:
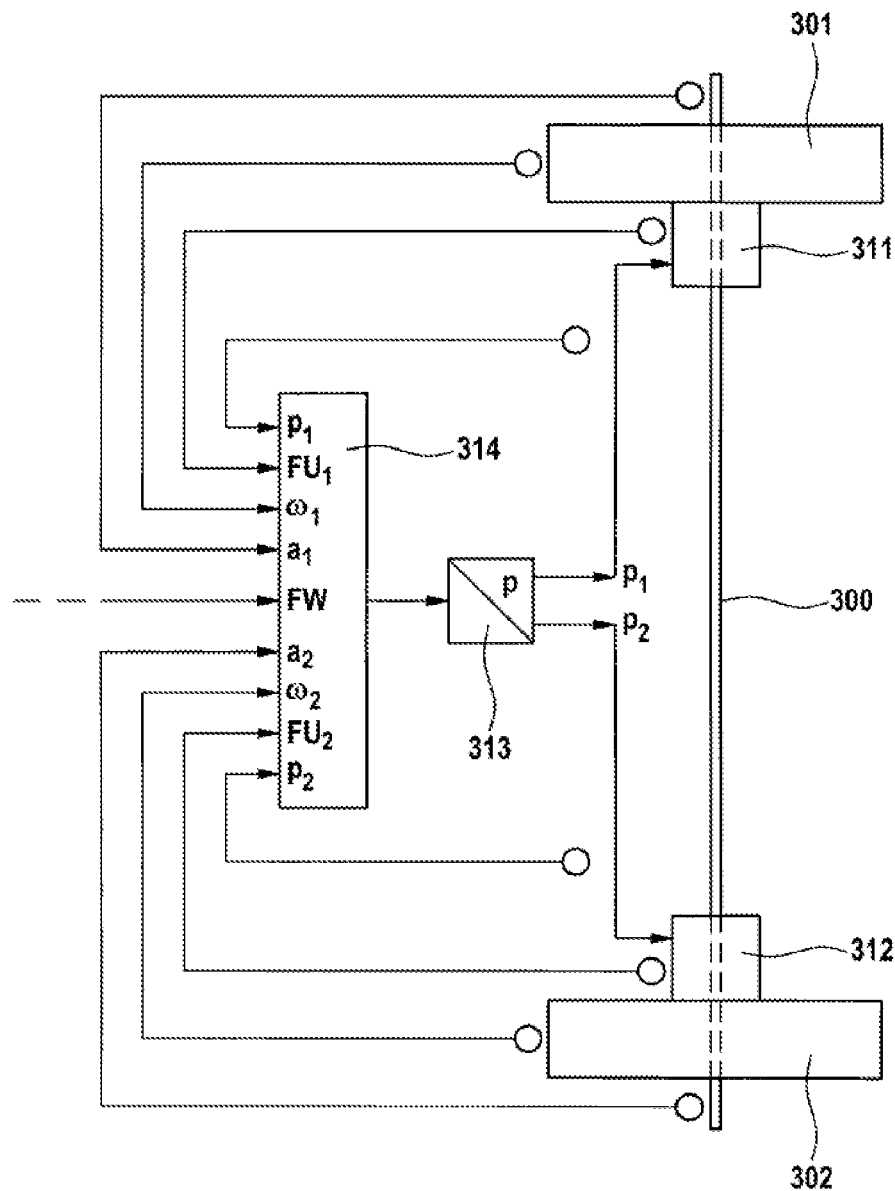
FIG. 16 shows a schematic representation of an example embodiment of a method according to the invention.

FIG. 16 shows a schematic illustration of an example embodiment of a method according to the invention using a vehicle axle. Two wheels 301, 302, each with associated hydraulically operated disk brakes 311, 312, are disposed on the vehicle axle 300 and are controlled by an electronic control unit 314 depending on a driver's demand FW by means of a hydraulic actuator 313 with pressures $p_1$, $p_2$. The control unit 314 regulates the pressures $p_1$, $p_2$ separately from each other according to desired brake torques, which are adapted to each other for a specified brake control function (e.g. ABS (Antilock Brake System), TCS (Traction Control System) or ESC (Electronic Stability Control)). The control unit 314 receives a signal $FU_1$, $FU_2$ from each disk brake 311, 312 for this purpose, which signal represents the actual acting brake force (or the brake torque). The signal $FU_1$, $FU_2$ can e.g. be the sensor signal for the displacement $\Delta x$, which is provided by a sensor device 38, 39, 40, 41 as described above, or a signal determined therefrom, such as e.g. a brake force $F_B$ derived therefrom. Furthermore, the control unit 314 uses one of the additional items of sensor information that are already present in many vehicles because of the aforementioned brake control functions, such as the adjusted hydraulic pressures $p_1$, $p_2$ (e.g. measured by means of pressure sensors), the wheel revolution rates $\omega_1$, $\omega_2$ of the wheels 301, 302 (e.g. measured by means of wheel revolution rate sensors) and the vertical axle accelerations $a_1$, $a_2$.

The method according to the example uses the fact that the circumferential forces on the two brakes 311, 312 of the axle 300 do not have to be known as absolute variables for many brake control functions. It is often sufficient to only control the ratio of the magnitudes of the circumferential forces relative to each other. For this purpose it is sufficient if the measurements on the two brakes of an axle relate to the same representative force component per brake, i.e. if a displacement $\Delta x$ is measured on each of the two brakes with one brake mounting sensor mechanism, e.g. according to the invention.

The displacement $\Delta x$ is, because of the longer effective length of the lining guide rails, essentially determined by the outer friction lining. The fact that the coefficients of friction of the inner and outer friction linings can occasionally be influenced partially differently by ambient influences, can according to the example be recognized by causality calculations taking into account additional sensor information from the region wheel/spring strut/axle and can be adequately taken into account during control. The control unit 314 according to the example is thus provided with the hydraulic pressures $p_1$, $p_2$, the wheel revolution rates $\omega_1$, $\omega_2$ and the vertical axle accelerations $a_1$, $a_2$ in order to be able to carry out the causality calculations mentioned. In an advantageous variant of the causality calculations, the frequency modulation of the wheel angular rates or wheel revolution rates $w_1$, $w_2$ is also taken into account.

A method according to the invention is e.g. used in operating brake processes and in electronically controlled brake processes and contributes to improvements in comfort.

While the above description constitutes the preferred embodiment of the present invention, it will be appreciated that the invention is susceptible to modification, variation and change without departing from the proper scope and fair meaning of the accompanying claims.

The invention claimed is:

1. A brake mounting for determining a measurement variable for an acting brake force or frictional force on a disk brake of the type having a caliper acting on friction linings which frictionally engage a brake disc and which is attachable to a motor vehicle, the brake mounting defining a z-axis being parallel to a central axis of the brake disc and normal to a friction surface of the brake disc and an x-axis that is perpendicular to the z-axis where the brake disc rotates in the x-axis direction and clamping force on the brake disc occurs in the z-axis direction, the brake mounting comprising:
at least two lining guide rails disposed across the brake disk and on which the friction linings on both sides of the brake disk are guided so as to be movable to a limited extent in the axial z axis direction of the brake disk,
a sensor device, by means of which an x axis displacement of at least one of the lining guide rails caused by a brake force effect in a direction perpendicular to the axial z axis direction of the brake disk is measured,
the sensor device having a first sensor element and a second sensor element, whose relative movement is measured,
wherein the sensor device is responsive to bending deflection of at least one of the lining guide rails.

2. The brake mounting as claimed in claim 1 further comprising in that the first and the second sensor element interact according to a magnetic measurement principle.

3. The brake mounting of claim 1, wherein the sensor device comprises a stiff sensor body, which extends across the brake disc along the at least one lining guide rail.

4. The brake mounting as claimed in claim 1, wherein the sensor device comprises a stiff rod-shaped sensor body, which is rigidly joined at one end thereof, to one of the lining guide rails or adjacent to one of the guide rails, and the first or the second sensor element is attached in an area of a free end of the sensor body.

5. The brake mounting as claimed in claim 4, wherein the sensor body extends along the one of the lining guide rails above the brake disk.

6. The brake mounting as claimed in claim 4 further comprising in that the sensor body is attached with the one end to the brake mounting to one of the lining guide rails, the first sensor element is disposed at the free end of the sensor body and the second sensor element is disposed in an area of the one of the lining guide rails facing away from the vehicle.

7. The brake mounting as claimed in claim 4 further comprising in that the sensor body is attached with the one end to an end of one of the lining guide rails facing away from the vehicle, the second sensor element disposed at the free end of the sensor body and the first sensor element is disposed to on one of the lining guide rails.

8. The brake mounting as claimed in claim 4 further comprising in that the sensor device including the sensor body is at least partly disposed in an inner bore of one of the lining guide rails.

9. An apparatus for determining a measurement variable for an acting brake force or frictional force on a hydraulically operated disk brake of a motor vehicle, the apparatus comprising:
a brake mounting attachable to the motor vehicle, the brake mounting having friction linings disposed on both sides of a brake disk that are guided in the axial z axis direction of the brake disk so as to be movable to a limited extent, the brake mounting defining a z-axis being parallel to a central axis of the brake disc and normal to a friction surface of the brake disc and an x-axis that is perpendicular to the z-axis where the brake disc rotates in the x-axis direction and clamping force on the brake disc occurs in the z-axis direction,
wherein the friction linings are pressable onto opposite lateral surfaces of the brake disk during braking,
a pair of lining guide rails disposed across the brake disk and the friction linings, which are supported on the brake mounting so as to be displaceable in the axial z axis direction of the brake disk, and
a sensor device coupled to at least one of the lining guide rails and connected to a control unit, which carries out brake control using a measurement signal of the sensor device,
wherein the lining guide rails are mounted in such a way that the brake mounting, during clamping or release of the disk brake, has a relationship characteristic between a brake control variable and x axis displacement, the relationship characteristic defining a curve, the relationship characteristic having a detectable change at a kink point of its curve at at least one value of the x axis displacement, the kink point being usable as a reference point for performing a calibration or for friction lining wear correction of the measurement signal.

10. A method for determining a measurement variable for an acting brake force or frictional force on a hydraulically operated disk brake with a brake mounting attachable to a motor vehicle, the brake mounting defining a z-axis being parallel to a central axis of the brake disc and normal to a friction surface of the brake disc and an x-axis that is perpendicular to the z-axis where the brake disc rotates in the x-axis direction and clamping force on the brake disc occurs in the z-axis direction, wherein the brake mounting comprises:
at least two lining guide rails disposed across a brake disk, on which friction linings disposed on both sides of the brake disk are guided in the axial z axis direction of the brake disk so as to be displaceable to a limited extent, and
a housing disposed across the brake disk and the friction linings,
the method comprising:
measuring, via a sensor device disposed on the brake mounting, an x axis displacement of at least one part of at least one of the lining guide rails caused by a brake force effect in an x axis direction perpendicular to the axial direction of the brake disk,
wherein the sensor device includes a first and a second sensor element that are both disposed on the brake mounting.

11. The method as claimed in claim 10, wherein, during operation of the disk brake with the motor vehicle stationary, determining an inclination angle or a downgrade force of the motor vehicle from the x axis displacement or that an actual coefficient of friction is concluded from the x axis displacement during slipping or sliding of a wheel associated with the disk brake.

12. The method as claimed in claim 10 further comprising in that electronic brake control of the disk brake is carried out directly using a determined value of the x axis displacement without calculation or determination of a brake force or brake pressure, motor current, or brake pedal position.

13. The method as claimed in claim 10 wherein a characteristic of the brake mounting is predetermined or the characteristic of the brake mounting is determined during the operation of the disk brake, wherein the characteristic represents a relationship between a brake control variable and the x axis displacement during clamping or release of the disk brake, and an evaluation of the characteristic is carried out to detect a characteristic value of the characteristic at which a detectable change of a curve of the characteristic occurs, represented by an abrupt change of a gradient of the characteristic.

14. The method as claimed in claim 13 further comprising using the characteristic to determine a correction of a measured value of the x axis displacement in relation to friction lining wear, and using a corrected x axis displacement for brake control of the disk brake.

15. The method as claimed in claim 13 wherein an actual value of the characteristic of the brake mounting is determined or evaluated with the aid of a characteristic value of the characteristic at which a detectable change of a curve of the characteristic occurs, including an abrupt change of a gradient of the curve.

16. The method as claimed in claim 13 further comprising in that the brake control variable is determined from a measured value of the x axis displacement using the determined characteristic of the brake mounting, and that electronic brake control of the disk brake is carried out using the brake control variable.

\* \* \* \* \*